United States Patent [19]
Yamaoka et al.

[11] 3,898,118
[45] Aug. 5, 1975

[54] METHOD AND APPARATUS FOR COVERING ELONGATE MEMBERS

[75] Inventors: Takao Yamaoka; Osamu Sasaki; Takashi Yamana, all of Osaka, Japan

[73] Assignee: Sekisui Jushi Kabushiki Kaisha, Osali, Japan

[22] Filed: Feb. 6, 1974

[21] Appl. No.: 439,853

Related U.S. Application Data

[60] Division of Ser. No. 211,470, Dec. 23, 1971, which is a continuation-in-part of Ser. No. 821,274, May 2, 1969, abandoned.

[30] Foreign Application Priority Data
Sept. 17, 1968 Japan.............................. 43-67492

[52] U.S. Cl. .............. 156/201; 29/474.1; 156/203; 156/215; 156/244
[51] Int. Cl.² ........................................... B31F 1/00
[58] Field of Search ............ 156/461, 201, 244, 54, 156/212, 215, 466; 425/113; 264/174; 417/54, 86, 148; 29/474.1, 477.7

[56] References Cited
UNITED STATES PATENTS

| | | | |
|---|---|---|---|
| 2,088,446 | 7/1937 | Specht.................. | 29/474.1 |
| 2,741,296 | 4/1956 | Collins........................... | 156/466 X |
| 3,154,846 | 11/1964 | Alexander....................... | 29/477.7 |
| 3,374,743 | 3/1968 | Stutely et al.................... | 417/54 X |
| 3,503,823 | 3/1970 | Richart et al...................... | 156/244 |
| 3,574,016 | 4/1971 | Wahlberg........................ | 156/54 |

*Primary Examiner*—Douglas J. Drummond
*Assistant Examiner*—David A. Simmons
*Attorney, Agent, or Firm*—Fitzpatrick, Cella, Harper & Scinto

[57] ABSTRACT

Method and apparatus for covering a rigid elongate member of indefinitely continuous length by adhesively applying a tape to said member, advancing the member through a tapered, apertured throttle means, applying pressure to the tape, passing the taped member through a passage in a mandrel contained in a die, passing synthetic resin through a separate passage in the die, while withdrawing air contained in a gap formed between the extruded resin and the elongate member outside the die, and causing a tight contact between the extruded resin and the member with the tape thereon outside the die.

1 Claim, 12 Drawing Figures

PATENTED AUG 5 1975　　　SHEET　1　　3,898,118

METHOD AND APPARATUS FOR COVERING ELONGATE MEMBERS

This is a division of application Ser. No. 211,470 filed Dec. 23, 1971 for "Apparatus for Covering Elongate Members" which, in turn, is a continuation-in-part of application Ser. No. 821,274 entitled "Two-ply Covered Product and Process and Apparatus for the Production Thereof" filed May 2, 1969, now abandoned.

This invention relates to a product comprising a pipe or rod or the like covered at first with a thin tape and thereafter with thermoplastic resin. More particularly, the product is covered with thin tape by placing the longitudinal direction thereof in common with that of the tube or rod, closely contacting said tape to the tube or rod, and thereafter applying a coating of transparent thermoplastic resin, whereby the surface of the tape remains visible. The invention also relates to the process and apparatus for manufacturing such product.

Heretofore, it has been known to form a layer of thermoplastic resin on the outer surface of metallic tube or rod. However, such tube or rod has not been known which is manufactured by placing a thin tape wherein the longitudinal direction thereof is substantially in common with that of metallic or plastic tube or rod, and closely contacting such tape thereto, to cover the entire outer surface along the longitudinal axis thereof, and thereafter covering such surface by transparent thermoplastic resin, so that the surface of the type is visible from outside.

The invention of the product described herein thus relates to a two-ply covered product which comprises as a core a member having an elongage profile, wherein cross sections perpendicular to the longitudinal axis thereof have the same profile, a length of thin tape,- preferably a metallic foil, contacting to the outer surface of such member along the longitudinal axis thereof, said tape being placed in the manner in which the longitudinal direction thereof is substantially common with that of the elongate member, the tape covering the whole outer surface of said member and being closely contacted thereto, and the surface of said tape being covered by a resin, preferably a transparent thermoplastic resin.

The following is a more detailed explanation of the invention relating to the product.

The elongate member contemplated can be a tube or rod. In either case, the profile or a cross section at right angle to the longitudinal axis of the tube or rod need not be circular, but can be square, rectangular or any other complicated shape. However, it is necessary that any cross section of such member be uniform. The elongate member may be formed of any suitable material such as metal, wood or the like.

As to the thin long tape, it is required that the width thereof be wide enough to encircle the outer surface of the tube or rod along the longitudinal axis thereof. Actually, the width of tape is preferably just equal to the circumference of tube or rod but may be a little wider than that. The tape may have a metallic gloss on its surface, and metallic foil or cloth, paper or plastics, etcetra, metalized with metallic foil can be used as the material thereof. One of the most suitable materials is tape aluminum foil, the thickness thereof being of the order of 0.2 mm to 0.01 mm. The tape must be thin so as to be able to bend along the outer surface of the elongate member along the longitudinal axis thereof. On this tape various patterns, marks and colours may be printed whenever required. Also, if desired, the tape may be embossed.

The resin contemplated is preferably transparent so that the surface of the tape is visible through the layer of resin. Also, the resin must be thermoplastic, because it is intended that it be continuously applied through an extruder. Suitable examples of such resins are cellulose acetate and polyvinyl chloride. Such resin can be either of the so-called rigid or flexible types.

It will be appreciated that the tape will not be damaged, destroyed, corroded nor faded easily, but will retain an attractive appearance indefinitely because it is covered with the transparent plastic resin. In the case of aluminum tape covered with a cellulose acetate resin, for example, the product appears similar to nickel or chromium plated metal or stainless steel, but is considerably more economical since iron or plastic material can be used for the tube or rod. Also, by embossing said aluminum foil and giving the foil a relief pattern before covering it with the resin, a unique appearance, which cannot be obtained by plating, can be provided.

There has this been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the serveral purposes of the invention. It is important, therefore, that the claims be regarded as including such equivalent construction as do not depart from the spirit and scope of the invention. A specific embodiment of the invention has been chosen for purposes of illustration and description, and is shown in the accompanying drawings, forming a part of the specification, wherein:

Figure 11:
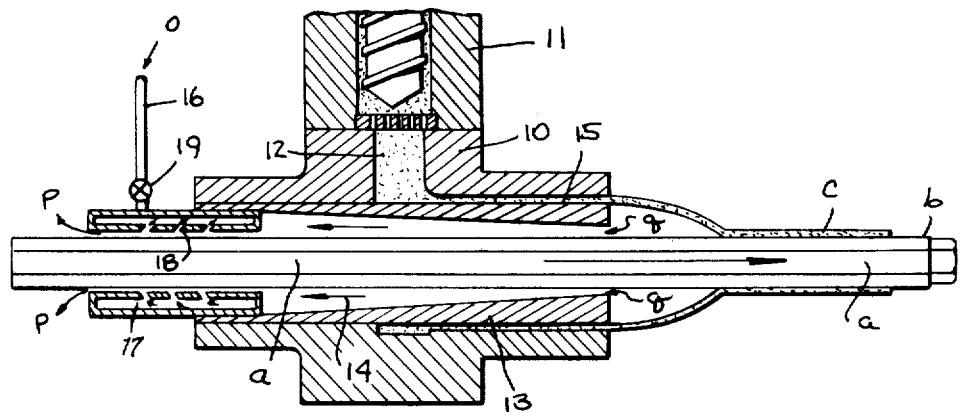
Figure 12:
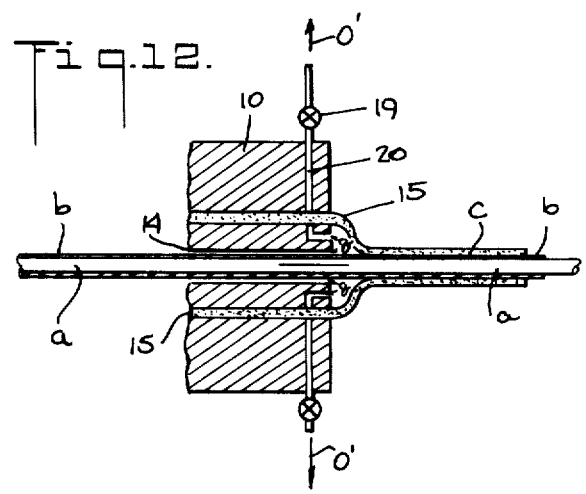

FIG. 11 is a longitudinal sectional view of an extruder machine in a modified embodiment according to the present invention; and FIG. 12 is a longitudinal sectional view of an extruder machine in a further modified embodiment according to the present invention. Referring first to FIGS. 6 to 9, *a* designates the elongate tube or rod; *b* the tape to cover same; and *c* transparent thermoplastic resin covering the tape; and *b*1 indicates the adjacent edges of tape *b*.

The covered long-shaped piece in this invention is suitable for material to compose various types of furniture such as kitchenware and the like. When a steel tube or rod is used as the elongated member *a*, and aluminum foil covers same, it can be cut to any desired length and by fixing an end cap *d* (FIG. 7) by screwing or cementing, an attractive, neat end can be obtained.

The tape to be used in the present process is not limited to thin tape having metallic gloss described in above explanation, but cloth, paper, or plastic film or sheet and the like can be used. It is necessary to feed the tape continuously as the tube or rod advances. To this end, we place the tube or rod above the tape so that the longitudinal axes of both are parallel, and then bring the two together wrapping the tape on the tube or rod.

According to the present process, it is necessary that the tube or rod and tape contact closely by following the method described above, and to transfer them into a throttle guide, the object of which is to reduce the clearance between the tube or rod and the tape surrounding it and to cause the tape to contact closely the tube or rod. The throttle guide is provided with holes which are just big enough to pass the tube or rod together with the tape surrounding it; and by passing them through it, close contact between tube and tape is achieved.

It is necessary to apply further pressure to the both edges of tape along the longitudinal axis thereof and bring them into close contact. As already described, the width of tape is just enough to encircle the outer surface of the tube or rod along the longitudinal axis thereof, therefore, after passing through the throttle guide, the tape will closely contact the tube or rod and both edges of the tape parallel to the longitudinal axis thereof will either come together or slightly overlap. Thus, it is intended to apply further pressure to make these meeting or slightly overlapping edges adhere more firmly together. This process of applying pressure may be achieved by a roll, and by placing the roll on the meeting or slightly overlapping edges and pressing same against the tube or rod. Before this pressing process, adhesive can be applied to the meeting or overlapping edges. When adhesive is applied, it is advisable to ensure the adhesion by pressing the rolls which may be heated on the place where the adhesion is applied.

The tube or rod covered with tape is then advanced into cross-head type dies mounted on an extruder and the tube or rod is covered with transparent thermoplastic resin on the outer surface of the tape. Such cross-head dies for covering purposes and such covering process, are already known.

If, in the practice of the present process, the tube or rod to be used is elongate and rigid, such as a metallic tube, such member cannot be wound and it must always be used in a substantially straight length cut as desired, while the tape can always be supplied in a wound state. However, even if there are breaks in the tube or rod, it is not necessary to provide special means and covering can be performed continuously. After the covering process has been completed, lines of separation of the tube or rod can be easily found on the surface of plastic resin layer and if the member is cut at such part, the discontinuity of the tube or rod does not constitute any handicap.

As stated, any desired pattern can be embossed or printed on the tape so that when covered with transparent plastic resin, a beautiful appearance can be obtained and the embossment or print can be kept beautiful for long periods.

The invention also relates to apparatus for carrying out the aforesaid process. The apparatus comprises, briefly, transferring means for advancing the elongate member in the direction of its longitudinal axis, means continuously supplying a tape to the surface of the members, throttling means for pressing the tape to the outer surface of the member, means butting adjacent edges of the tape and means applying a layer of plastic resin to the outer surface of the tape.

The transferring means may, for example, comprise a series of aligned rolls or rolls with a conveyor belt extending along their upper surfaces.

Figure 5:
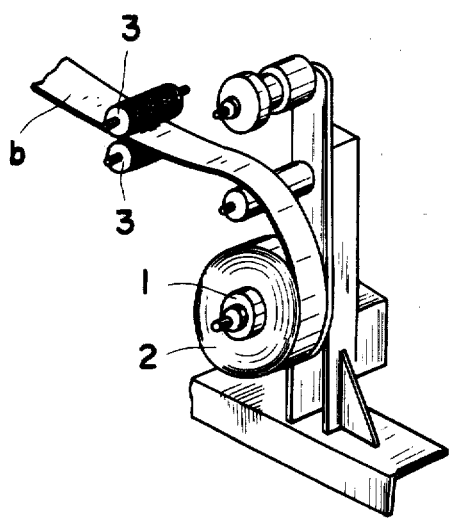
FIG. 5 is a perspective view of tape dispensing means.

The tape supply means is illustrated by way of example in FIG. 5 whereintape *b* is furnished in the form of a roll 2 mounted on a core 1. If desired, the tape may be printed or embossed after unrolling as by embossing rolls 3,3. It is, of course, required that the longitudinal direction of the tape match that of the metallic tube.

Figure 1:
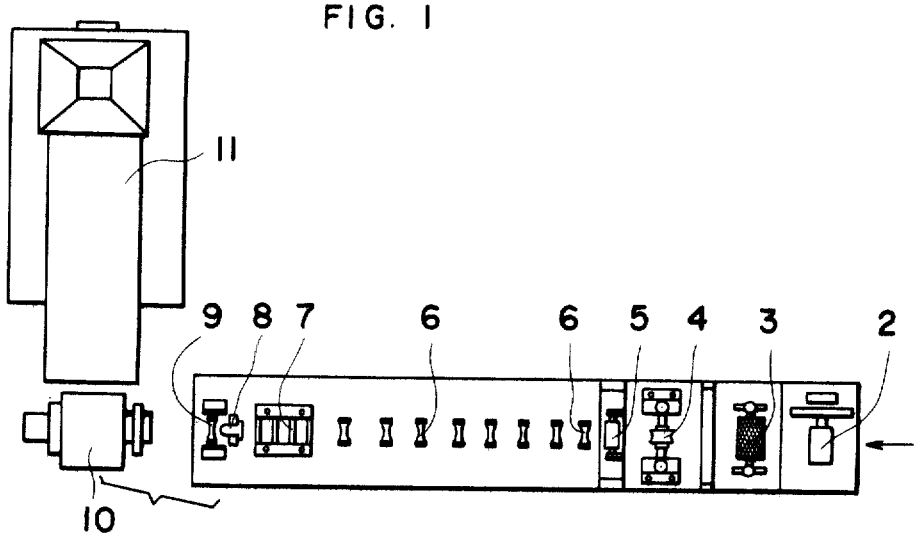
FIG. 1 is a top plane view of the apparatus for forming the product.
Figure 2:
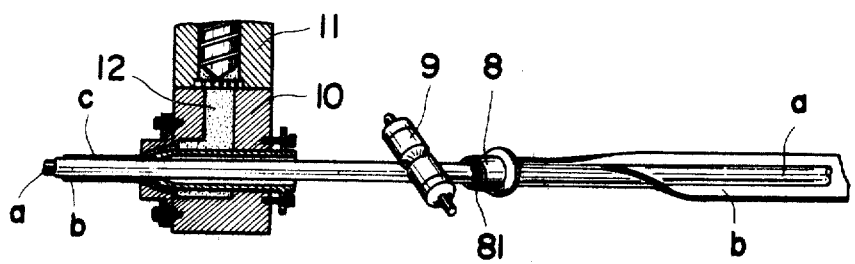
FIG. 2 is a view, partially in cross-section, illustrating formation of the product.
Figure 3:
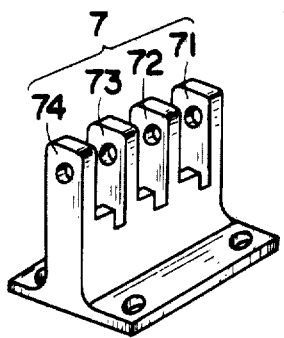
FIG. 3 is a perspective view of a guide member forming part of the apparatus of FIG. 1.
Figure 4:
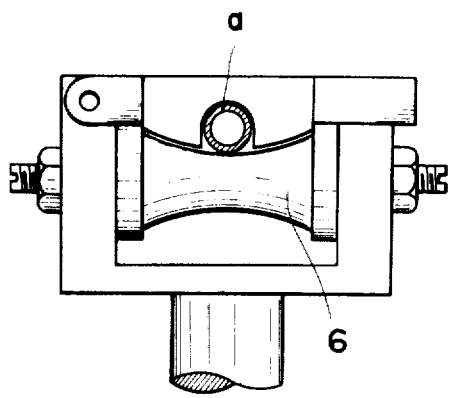
FIG. 4 is an end elevational view of a portion of such apparatus.

Tape *b*, as shown in FIGS. 1 and 2, passes embossing rolls 3 and, by guide roll 5, is brought beneath the tube or rod *a* and is then conveyed together with the tube or rod *a* by several curved surface rolls 6 which gradually cause it to contact the bottom of the tube or rod. The tape and tube or rod then passes through guide 7 which, as shown in FIG. 3, is provided with several parts 71, 72, 73 and 74, each of which has a hole, these becoming gradually smaller. By passing such guide 7, tape *b* is made gradually to contact closely to the surface of the tube or rod *a*, After tape *b* is thus almost fully contacted to the surface of the tube or rod *a*, they are transferred into throttling device 8.

The object of the throttling device 8 (FIGS. 1 and 2) is to complete contact of the tape *b* to the tube or rod *a*. The throttling device 8 is provided with a hole 81 through which passes the tube or rod *a* surrounded with tape *b*. The inside surface of such hole 81 is tapered, becoming narrower toward the direction in which the tube or rod progresses; and at its narrowest part, the hole is provided with elastic material which causes tape *b* to contact firmly the tube or rod *a*. As examples of elastic material to be used on the throttling device 8, we may use felt, woollen cloth, blanket cloth, rubber, artificial velvet, foamed fluorocarbon resin, polyethylene, etc.

An example of the pressing means to contact both edges of the tape together closely may be a roll 9 shown in FIGS. 1 and 2. This roll 9 presses the edges of tape *b* which are butted along the tube of rod *a*, and thus tape *b* contacts perfectly to tube or rod *a*.

An embodiment of the means for applying a layer of resin to the tape *b* is shown at 10 in FIGS. 1 and 2 and may comprise dies 10 and extruder 11.

From the discharge outlet of the die 10, a thermoplastic resin 12 is extruded in tubular form and made to compose a cover layer *c* on the outside of tape *b*. Thus, tape *b* covers the outer surface of the tube or rod *a* and further transparent thermoplastic resin *c* covers the outside thereof so that we obtain a two-ply covered product. This apparatus is very simple in construction and yet assures excellent performance.

Figure 9:
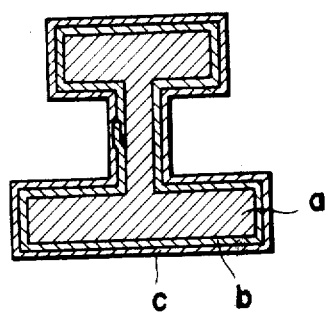

Particularly where the elongate member has a cross section such as illustrated in FIG. 9, when this elongate member is coated with a layer of thermoplastic resin through the dies shown in FIG. 1, the thermoplastic resin in its fused condition does not penetrate into each corner or turning portion of the elongate member so that blowholes containing gas therein are formed which, in extreme cases, constitutes a cause for separation of the sheathing layer from the elongate member, or otherwise may hurt its appearance. In addition, it has been well known that an adhesive agent, generally applied on at least one surface of the tape, is susceptible to a relatively high temperature and, therefore, sometimes deteriorates due to the high temperature. A difficulty has also been encountered in that the thermoplastic resin within the dies 10 in the fused condition does not maintain in its static pressure condition so that little uniformity is imparted to the sheathing layer.

In such cases, it is preferable to employ an extruder machine as shown in FIG. 11 and FIG. 12.

In FIG. 11 the die 10 is provided with a mandrel 13 which is in turn formed with a passage 14 for the elongate member $a$. As the elongate member $a$ continuously emerges out of the passage 14, thermoplastic resin in a fused condition is concurrently extruded in the form of hollow tubing through its passage 15 in the extruder machine, whereby the elongate member $a$ is sheathed with the thermoplastic resin thus extruded. However, it should be noted that, since the passages 14 and 15 are independently disposed in the die 10, contact between the thermoplastic resin extruded and the elongate member takes place outside the die 10, thereby forming a sheathing layer with said extruded thermoplastic resin 12.

The passage 15 is disposed around the passage 14 and so shaped that the thermoplastic resin when extruded outside the die 10 can encircle the elongate member passing through the passage 15. However, the shape of the passage 15 as viewed in the longitudinal direction of FIG. 11 may be selected to suit the cross section of the elongate member. The distance between the passages 14 and 15, at the position where the elongate member or the thermoplastic resin 12 is emerged from the die 10, should not be large, or else the tight contact between the elongate member and the extruded resin after they are emerged outside the die 10 will become difficult.

When the tight contact between the elongate member and the extruded resin takes place, an annular gap $q$ is formed therebetween. In order to eliminate this gap $q$, according to the present invention, compressed air is supplied from its source $o$ by means of a conduit 16 to a chamber 17. This chamber 17 is formed with a plurality of exhaust holes, as generally indicated by 18 in FIG. 11, so that the compressed air flows through said holes to the atmosphere in the direction as indicated by $p$. At this time, the value of the pressure in the space defined between the gap $q$ and the chamber 17 is suddenly reduced and, thus, the air contained in said spacing is sucked in the same direction as that of the flow of the compressed air. Consequently, the gap $q$ is reduced by the shrinkage of that portion of the extruded resin, and the elongate member can be sufficiently sheathed by the thermoplastic resin layer $c$ as it is advanced in the direction opposite to the flow of the compressed air.

Although in the embodiment shown in FIG. 11, the jet flow of compressed air is utilized to establish the reduced pressure condition in the gap $q$ or abovementioned spacing, other suction means may be employed, such as shown in FIG. 12.

Referring now to FIG. 12, the die 10 is provided with suction conduits extending between a suction pump (not shown) and respective guide holes 20 formed in the die 10, said guide holes 20 being in turn connected with the gap $q'$. It will thus be understood that, when the suction pump is operating, the air contained in the gap $q'$ is sucked therefrom to the atmosphere in the direction as indicated by the arrows $o'$, whereby a tight contact between the elongate member and the extruded resin takes place about the gap $q'$ in the same manner as given by the machine of FIG. 11. Reference numeral 19 represents a valving means interposed between the guide holes 20 and the suction pump.

By way of an example of the practice of our invention, we may use an iron tube of outside diameter of 9 mm and a wall thickness of 1 mm, aluminum foil of a thickness of the order of 0.05 mm and a width of about 32 mm as tape, and cellulose acetate as plastic resin. Also polyvinyl acetate in emulsion was applied to both edges along the longitudinal direction of said tape.

The apparatus shown in FIG. 1 was used, the tape $b$ being unwound from woll 2 and supplied continuously to the undersurface of the metallic tube by guide rolls 5 through embossing rolls 3. An iron tube $b$ cut to a standard length was transferred from the side indicated by an arrow in FIG. 1 by rolls 4 and by guide rolls 5 placed above tape $b$, and furthermore conveyed by curved surface rolls 6. By curved surface rolls 6, tape $b$ is pushed gradually nearer to the bottom of the tube $a$, and by passing same through guide 7, the degree of contact becomes very close; and then by passing the tube and tape through throttling device 8, the tape $b$ is brought into closer contact with the tube. Rolls 9 press both side edges of the tape, and polyvinyl acetate may have been applied thereto beforehand to bond them together and prevent the side edges from peeling off.

Figure 6:
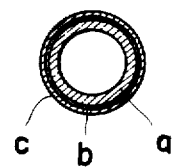
FIG. 6 is a cross section of the product.
Figure 7:
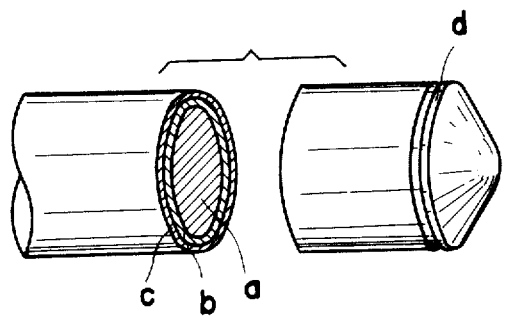
FIG. 7 is a perspective fragmented view of the product.
Figure 8:
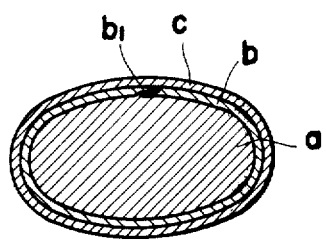
FIGS. 8, 9 and 10 show enlarged cross section of other examples thereof.

After this, by covering the tape with cellulose acetate in die 10, we obtain a finished two-ply covered product shown in FIG. 6.

This product produced according to the present invention, does not appear as a two-ply covered item since each layer settles perfectly and uniformly, and the finished product has a beautiful appearance as if it were plated metallic tubing and any desired pattern may be printed or embossed on the tape to be visible. The product, therefore, is valuable as a constructing material for furniture and the like.

Figure 10:
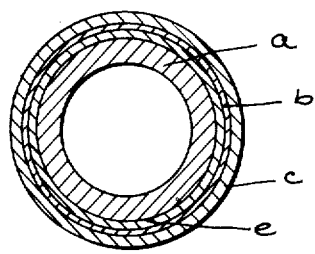

In the case where the tube and the tape are not directly contacted, but a synthetic resin layer is interposed between them, as shown in FIG. 10, various advantages can be obtained. Concretely speaking the advantages in the manufacturing process are first, the tape $e$ is easily brought into contact with the tube $a$ by means of a synthetic resin layer, and secondly, the appearance of a closely contacted tape $b$ can be beautifully maintained because even when the outside diameter of the tube $a$ is irregular over the entire length thereof, the diameter can be uniformly maintained by the synthetic resin tube coating.

When the width of the tape is predetermined with respect to the circumference of the tube and this tape is used in sheathing a tube having an irregular outer diameter over the entire length thereof, a gap will be formed between the opposite edges of the tape when the latter encircles the periphery of the tube. However, such disadvantages can be prevented by the provision of the aforementioned synthetic resin whereby the tube can be covered by the tape so that the opposite edges are abutted to each other or overlapped one over the other. Further, the appearance of the product provided with the above synthetic resin layer *e* is beautiful since the above applied portions of the tape are not in excess. Also, in case the tube is made of metal and the tape is made from another metal, the two kinds of metals are prevented from contacting each other by the synthetic resin layer *e*, the metals are inhibited from electrical corrosion and the article can be permanently maintained in a beautiful condition.

A bar made of metal, the cross section of which being of I-shape, having 15 mm. in upper width, 20 mm. in bottom width and 20 mm. in height, as shown in FIG. 9, was tightly sheathed with aluminum foil *b*, having 0.03 mm. in thickness and 102 mm. in width, by the use of rolls arranged to suit the I-shape of said bar. This aluminum foil sheathed bar was continuously supplied through the mandrel 13 of the die 10 shown in FIG. 11 at the rate of 5 meters per minute while cellulose acetate fused at 200°C. was extruded through the passage 15 so as to give the form of a tubing outside the die 10 around the metallic bar. Eventually, the gap *q* was formed between the bar *a* and the extruded resin or resin layer *c*. As the air contained in the gap was subsequently sucked to the atmosphere, the tight contact between the bar and the resin layer or extruded resin took place about 10 mm. away from the die 10 (25 mm. in the case where no air is sucked). At this time, in order to suck the air out of the gap, compressed air at 1.5 Kg/cm$^2$ was continuously supplied from its source O to the chamber and then exhausted in the direction p through the exhaust ports 18.

The distance between the passages 14 and 15, at a position where the bar or the resin layer is emerged from the die 10, was 2.5 mm.

It should be noted that compressed air in excess of 1.5 Kg/cm$^2$ will result in sucking the extruded resin into the passage 14, while compressed air below this pressure will not provide the desired pressure reduced condition in the chamber.

The article thus obtained was beautiful, without any blowholes existing between the bar and the resin layer and with smooth surfaces over the entire length thereof.

We claim:

1. A process for preparing a decorative product having an attractive appearance of metallic gloss, comprising: continuously applying to an elongated metal tube a tape having a metallic gloss on its outer surface and having a thickness of the order of 0.01 mm to 0.2 mm and a width substantially equal to the outer peripheral dimension of said tube, the longitudinal axis of said tape being substantially parallel to that of said tube, advancing said tube together with said tape onto a plurality of curved surface rolls arranged in a straight line, and then into a guide provided with a plurality of parts each of which having a hole, said holes being successively smaller in the direction of advancement; while advancing, said tape being applied to said tube by an adhesive at least along one side thereof, further advancing said tube into throttle means having an aperture the interior surface of which being covered with elastic material and tapered gradually to narrow in the direction of advance of said tube, thus closely contacting said tape with the outer surface of said tube, applying pressure to said tape to butt and adhere adjacent side edges thereof on said tube by means of a roll, passing said tube with the tape thereon through a passage in a mandrel contained in a die, passing a transparent synthetic resin in a molten condition through a passage formed between the outer wall of said mandrel and the inner wall of said die, said passages being independently formed in the die without any contact with each other, a chamber provided with a plurality of exhaust holes being attached to said inner wall of said mandrel on the inlet side of said tube so that the compressed air may flow through said holes to the atmosphere in the direction opposite to the advancement direction of the tube, thus withdrawing air contained in a gap formed between the extruded resin and the tube outside the die, and causing a tight contact between the extruded resin and the member with the tape thereon outside the die.

* * * * *